United States Patent
Hu et al.

(10) Patent No.: US 12,148,920 B2
(45) Date of Patent: *Nov. 19, 2024

(54) POSITIVE ELECTRODE MATERIAL AND PREPARATION METHOD THEREFOR, AND LITHIUM ION BATTERY

(71) Applicant: BYD COMPANY LIMITED, Guangdong (CN)

(72) Inventors: Dongjie Hu, Shenzhen (CN); Hao Wei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 850 days.

This patent is subject to a terminal disclaimer.

(21) Appl. No.: 17/259,098

(22) PCT Filed: Jul. 10, 2019

(86) PCT No.: PCT/CN2019/095352
§ 371 (c)(1),
(2) Date: Jan. 8, 2021

(87) PCT Pub. No.: WO2020/011178
PCT Pub. Date: Jan. 16, 2020

(65) Prior Publication Data
US 2021/0328212 A1    Oct. 21, 2021

(30) Foreign Application Priority Data
Jul. 10, 2018   (CN) .......................... 201810753614.5

(51) Int. Cl.
*H01M 4/131*   (2010.01)
*H01M 4/136*   (2010.01)
(Continued)

(52) U.S. Cl.
CPC .......... *H01M 4/366* (2013.01); *H01M 4/131* (2013.01); *H01M 4/136* (2013.01); *H01M 4/38* (2013.01);
(Continued)

(58) Field of Classification Search
None
See application file for complete search history.

(56) References Cited

U.S. PATENT DOCUMENTS 6,368,749 B1    4/2002  Yanai et al.
2005/0153206 A1  7/2005  Oesten et al.
(Continued)

FOREIGN PATENT DOCUMENTS

CN    1647298 A    7/2005
CN  102386389 A    3/2012
(Continued)

OTHER PUBLICATIONS

English translation of KR 2013/0116585 (Year: 2013).*
(Continued)

*Primary Examiner* — Yoshitoshi Takeuchi

(57) ABSTRACT

A cathode material, a preparation method thereof, and a lithium ion battery are provided. The cathode material comprises cathode material particles comprising a central area, an intermediate layer, and a surface layer, wherein the intermediate layer is located between the central area and the surface layer; and the central area comprises a lithium oxide, the intermediate layer comprises elemental sulfur, and the surface layer comprises elemental sulfur and elemental carbon, in which the lithium oxide comprises $\delta\text{LiNi}_m\text{Co}_n\text{X}_{(1-m-n)}\text{O}_2\cdot(1-\delta)\text{Li}_2\text{MO}_3$, where $0\leq\delta\leq1$, X includes at least one selected from Mn, Al, Nb, and Fe, M includes at least one selected from Mn, Al, Nb, Fe, Co, and Ni, $0\leq m<1$, and $0\leq n<1$.

16 Claims, 2 Drawing Sheets

(51) Int. Cl.
  *H01M 4/36* (2006.01)
  *H01M 4/38* (2006.01)
  *H01M 4/52* (2010.01)
  *H01M 4/525* (2010.01)
  *H01M 4/62* (2006.01)
  *H01M 10/0525* (2010.01)

(52) U.S. Cl.
  CPC .......... *H01M 4/525* (2013.01); *H01M 4/625* (2013.01); *H01M 4/628* (2013.01); *H01M 10/0525* (2013.01)

(56) References Cited

U.S. PATENT DOCUMENTS

| | | | |
|---|---|---|---|
| 2011/0089369 A1* | 4/2011 | Patoux | C01G 53/44 252/182.1 |
| 2013/0337345 A1 | 12/2013 | Abouimrane et al. | |
| 2017/0092944 A1 | 3/2017 | Ding et al. | |
| 2018/0123133 A1 | 5/2018 | Muldoon et al. | |
| 2018/0175387 A1* | 6/2018 | Kim | H01M 4/134 |

FOREIGN PATENT DOCUMENTS

| | | | |
|---|---|---|---|
| CN | 102683659 A | 9/2012 | |
| CN | 102723470 A | 10/2012 | |
| CN | 103208618 B | 7/2013 | |
| CN | 102056844 B | 9/2013 | |
| CN | 103474633 A | 12/2013 | |
| CN | 103972464 A | 8/2014 | |
| CN | 104253275 A | 12/2014 | |
| CN | 204118182 U | 1/2015 | |
| CN | 105304908 A | 2/2016 | |
| CN | 105406059 A | 3/2016 | |
| CN | 105529446 A | 4/2016 | |
| CN | 104064738 B | 10/2016 | |
| CN | 106299307 A | 1/2017 | |
| CN | 106549157 A | 3/2017 | |
| CN | 106558682 A | 4/2017 | |
| CN | 106711435 A | 5/2017 | |
| CN | 107017387 A | 8/2017 | |
| CN | 107017388 A | 8/2017 | |
| CN | 107195873 A | 9/2017 | |
| CN | 107548378 A | 1/2018 | |
| CN | 107681114 A | 2/2018 | |
| CN | 107785537 A | 3/2018 | |
| CN | 102024950 B | 5/2018 | |
| CN | 108183206 A | 6/2018 | |
| KR | 2013/0116585 | * 10/2013 | .......... H01M 10/052 |
| KR | 20170142344 A | 12/2017 | |

OTHER PUBLICATIONS

Auvergniot et al., "Interface Stability of Argyrodite Li6PS5Cl toward LiCoO2, LiNi1/3Co1/3Mn1/3O2, and LiMn2O4 in Bulk All-Solid-State Batteries", Chemistry of Materials, American Chemical Society, Apr. 7, 2017, vol. 29, pp. 3883-3890.

Demoto et al., "Characterization, average and electronic structures during charge-discharge cycle in 0.6Li2MnO3-0.4Li(Co1/3Ni1/3Mn1/3)O2 solid solution of a cathode active material for Li-ion battery", Journal of Power Sources, Oct. 2015, vol. 273, pp. 1023-1029.

International Search Report and Written Opinion for Application No. PCT/CN2019/095352, mailed on Sep. 25, 2019, 10 pages.

* cited by examiner

POSITIVE ELECTRODE MATERIAL AND PREPARATION METHOD THEREFOR, AND LITHIUM ION BATTERY

CROSS-REFERENCE TO RELATED APPLICATIONS

This application is a national phase application of International Patent Application No. PCT/CN2019/095352, filed with the China National Intellectual Property Administration (CNIPA) on Jul. 10, 2019, which is based on and claims the priority to and benefit of Chinese Patent application Ser. No. 201810753614.5 filed on Jul. 10, 2018 with the CNIPA. The content of all of the above applications is incorporated herein by reference in their entirety.

FIELD

This application relates to the field of materials and new energy, and in particular, to a cathode material, a preparation method thereof, and a lithium ion battery.

BACKGROUND

Among various kinds of new energy batteries, due to the high specific energy, high voltage, low self-discharge, good safety performance, and long cycle life, a lithium ion battery has attracted wide attentions, and is successfully industrialized. The main components of lithium ion battery include an electrolyte, a separator material, and a cathode and an anode material. The cathode material of lithium ion battery occupies a large proportion in the battery, and the performance of the cathode material directly affects the battery performance, so the cathode material is the key to the development and performance improvement of the lithium ion battery.

SUMMARY

In the prior art, sulfur element is added to the cathode material to increase the lithium binding capacity of the cathode material, thereby increasing the theoretical specific capacity of the battery.

In one aspect of this application, this application provides a cathode material. The cathode material comprises cathode material particles, wherein the cathode material particles includes a central area, an intermediate layer, and a surface layer, where the intermediate layer is located between the central area and the surface layer; and the central area comprises lithium oxide, the intermediate layer comprises elemental sulfur, and the surface layer comprises elemental sulfur and elemental carbon, in which the lithium oxide comprises $\delta LiNi_mCo_nX_{(1-m-n)}O_2 \cdot (1-\delta)Li_2MO_3$, wherein $0 \leq \delta \leq 1$, X includes at least one selected from Mn, Al, Nb, and Fe, M includes at least one selected from Mn, Al, Nb, Fe, Co, and Ni, $0 \leq m < 1$, and $0 \leq n < 1$. The cathode material particle precursor of the cathode material has pores suitable for filling sulfur element, and the pores can protect the elemental sulfur from being dissolved in the electrolyte. The elemental carbon can further prevent the elemental sulfur from dissolving in the electrolyte, and is beneficial to improving the overall electrical conductivity of the material. The particle structure of the cathode material does not reduce the overall compaction density of the cathode material, and is beneficial to increasing the volume energy density of the cathode material.

In another aspect of this application, this application provides a method for preparing a cathode material comprising cathode material particles. The method comprises: mixing a metal ion-containing solution, a complexing agent, and a precipitating agent while stirring, co-precipitating to obtain a core precursor, and mixing the core precursor with a lithium source and baking to obtain a cathode material particle precursor formed by packing lithium oxide and comprising a precursor central area and a precursor surface layer located outside the precursor central area, where the metal includes at least one of Mn, Al, Nb, and Fe, the lithium oxide comprises $\delta LiNi_mCo_nX_{(1-m-n)}O_2 \cdot (1-\delta)Li_2MO_3$, $0 \leq \delta \leq 1$, X includes at least one selected from Mn, Al, Nb, Fe, Co, and Ni, M includes at least one selected from Mn, Al, Nb, Fe, Co, and Ni, $0 \leq m < 1$, and $0 \leq n < 1$; mixing the cathode material particle precursor with a sulfur source, melting and solidifying, to fill the elemental sulfur in the surface layer and obtain a sulfur-containing cathode material particle precursor; mixing the sulfur-containing cathode material particle precursor with a carbon source, and forming elemental carbon on the outer surface of the sulfur-containing cathode material particle precursor; and dispersing the elemental sulfur by thermal melting and interpenetration treatment, to obtain cathode material particles with a surface layer comprising elemental sulfur and elemental carbon. The cathode material particle precursor obtained in the above method has a micro structure suitable for filling sulfur element, thus preventing the elemental sulfur from being dissolved in the electrolyte. The elemental carbon can further prevent the elemental sulfur from dissolving in the electrolyte, and is beneficial to improving the overall electrical conductivity of the material. The particle structure of the cathode material does not reduce the overall compaction density of the cathode material, and is beneficial to increasing the volume energy density of the cathode material.

In another aspect of this application, this application provides a lithium ion battery. The lithium ion battery includes the foregoing cathode material or the cathode material prepared by the foregoing method. Therefore, the lithium ion battery has a higher energy density and a better cycle life.

DETAILED DESCRIPTION

Figure 1:
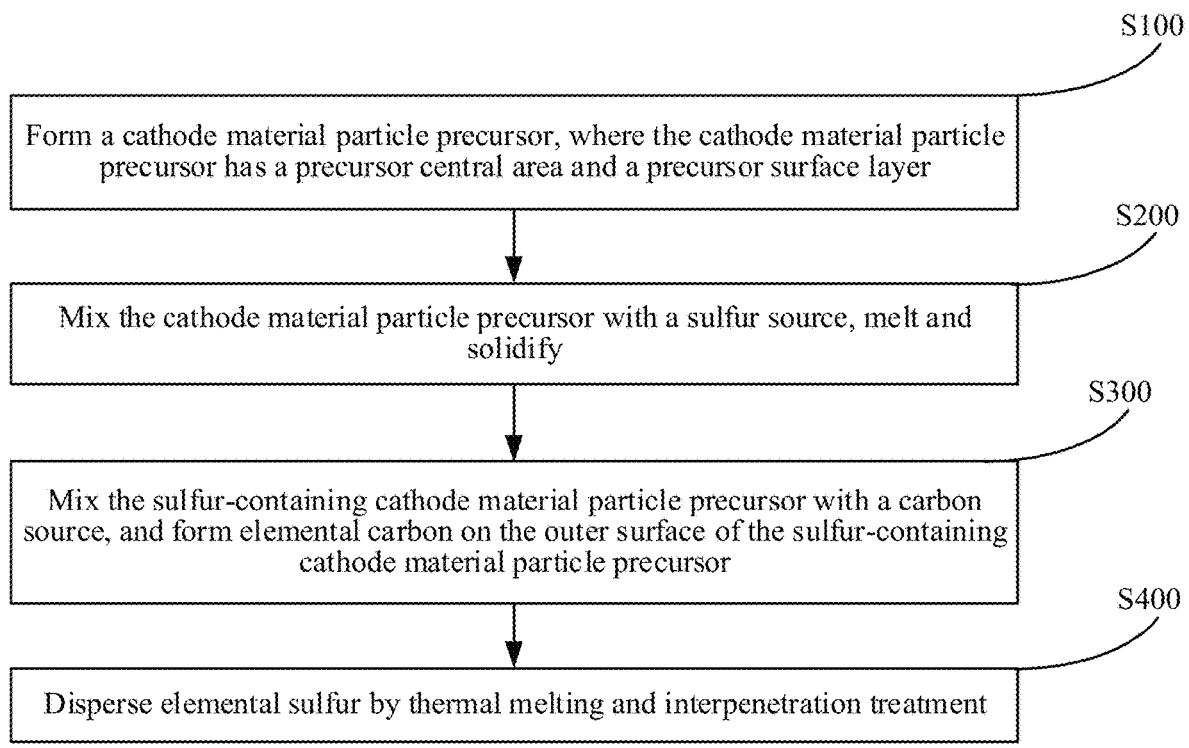
FIG. 1 is a process flow chart of a preparation method according to an embodiment of the present application.

Embodiments of the present application are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining the present application, and should not be construed as a limitation on the present application.

Endpoints of all ranges and all values disclosed herein are not limited to the precise ranges or values, and these ranges or values should be understood as including values close to these ranges or values. For value ranges, endpoint values of the ranges, the endpoint values of the ranges and individual point values, and the individual point values can be combined with each other to obtain one or more new value ranges. These value ranges should be construed as being specifically disclosed in the present specification.

The inventors of the present application find through long-term experiments that, due to the electronic inertness of sulfur and the easy dissolution in an organic solvent of a sulfur intermediate during lithium intercalation, the cathode material containing sulfide ions suffers a greater limitation in practical applications. Although the above problem can be alleviated to a certain extent by adding carbon as a carrier to the cathode material, simply relying on elemental carbon to segregate the electrolyte to prevent sulfur from dissolving in the electrolyte will not only increase the production cost of the cathode material, extend production process, and reduce the production efficiency, but also make it difficult to fundamentally solve the above-mentioned problem of sulfur-based cathode materials. After in-depth researches, the inventors find that, in sulfur-based cathode materials, the problem of easy dissolution of sulfur in the electrolyte is largely caused by the structure of the cathode active material that is not suitable for filling sulfur atom.

In one aspect of this application, this application provides a sulfur-containing cathode material. The cathode material comprises cathode material particles comprising a central area, an intermediate layer, and a surface layer. The intermediate layer is located between the central area and the surface layer. The central area comprises lithium oxide, the intermediate layer comprises elemental sulfur, and the surface layer comprises elemental sulfur and elemental carbon. In the cathode material particle precursor, the micro structure (i.e., pores) in the intermediate layer is suitable for filling sulfur element, and the pores are small, so the cathode material can prevent sulfur from dissolving in the electrolyte. The surface layer of the cathode material particles comprises elemental carbon and elemental sulfur. Elemental carbon can further prevent sulfur from dissolving in the electrolyte. The cathode material has a multi-layer core-shell structure, and the particle structure of the cathode material does not reduce the overall compaction density of the material, thereby contributing to the increase in the volume energy density of the cathode material.

Hereinafter, the cathode material will be explained in detail by specific embodiments of the present application.

Since elemental sulfur is an insulator, adding sulfur to the cathode material can increase the specific capacity of the cathode material particles, but the conductivity of the obtained cathode material thus is poor. Adding elemental carbon to the surface layer can effectively improve the overall conductivity of the cathode material. In addition, the elemental carbon in the surface layer can also alleviate the dissolution of elemental sulfur, that is, it can alleviate the shuttle effect. Unlike the conventional carbon coating that completely covers the surface of the cathode material, in the cathode material particles according to an embodiment of the present application, the elemental carbon and elemental sulfur are dispersed in the surface layer of the cathode material particles, so that a non-compromised specific surface area of the cathode material particles is ensured while the beneficial effects of the traditional carbon coating is achieved. Moreover, the elemental sulfur can also be distributed in a more complex skeleton structure (that is, in a skeleton structure composed of lithium oxide and elemental carbon), thereby better alleviating the shuttle effect and preventing the elemental sulfur from dissolving in the electrolyte.

According to an embodiment of the present application, the specific chemical composition of the lithium oxide is not particularly limited, and can be selected by those skilled in the art according to actual situations. For example, according to some embodiments of the present application, the lithium oxide may be composed of ternary materials. Specifically, the chemical formula of lithium oxide can be $\delta \text{LiNi}_m\text{Co}_n\text{X}_{(1-m-n)}\text{O}_2 \cdot (1-\delta)\text{Li}_2\text{MO}_3$, where $0 \leq \delta \leq 1$, X includes at least one selected from Mn, Al, Nb, and Fe, M includes at least one selected from Mn, Al, Nb, Fe, Co, and Ni, $0 \leq m < 1$, and $0 \leq n < 1$. More specifically, the average valency of M in $\text{Li}_2\text{MO}_3$ can be 4. The average valency of X in $\text{LiNi}_m\text{Co}_n\text{X}_{(1-m-n)}\text{O}_2$ can be between 3 and 4. A cathode material particle precursor structure with pores in the precursor surface layer can be obtained with the lithium oxide particles that meet the above chemical composition by simply controlling the synthesis process, where the pores in the surface layer are suitable for filling elemental sulfur.

According to a specific embodiment of the present application, the ternary material may include a nickel cobalt manganese (NCM) ternary material, a nickel cobalt aluminum (NCA) ternary material, or a lithium-rich material. The nickel cobalt manganese (NCM) ternary material can be type 111 (N:C:M=1:1:1, the following type numbers represent the atomic ratio of nickel, cobalt, and manganese in the ternary material, which will not be repeated), type 433, type 532, type 666, or type 811. The nickel cobalt aluminum (NCA) ternary material may be, for example, $\text{LiNi}_{0.8}\text{Co}_{0.15}\text{Al}_{0.05}\text{O}_2$. According to other embodiments of the present application, the lithium oxide can include $\text{LiNi}_{1-x-y}\text{Co}_x\text{Mn}_y\text{O}_2$, in which Mn may be replaced by any one of Al, Nb, and Fe, or 2, 3, or 4 of Mn, Al, Nb, and Fe are contained. When more than one element of Mn, Al, Nb, and Fe is contained, the total atomic content of the more than one element of Mn, Al, Nb, and Fe in the ternary material meets (1-m-n) in $\text{LiNi}_m\text{Co}_n\text{X}_{(1-m-n)}\text{O}_2$.

According to an embodiment of the present application, the cathode material particles may be formed by packing lithium oxide nanoparticles. The thickness of the intermediate layer of the cathode material particles is 0.5-20 μm, for example 5 μm, 10 μm, and 15 μm, etc., and the average particle size of the cathode material particles is 5-50 μm, for example, 5 μm, 10 μm, 15 μm, 20 μm, 25 μm, 30 μm, 35 μm, 40 μm, 45 μm, and 50 μm, etc. The thickness of the surface layer may be 0.2-5 μm, for example 0.2-1 μm. It should be noted that in this application, "surface layer" refers to an area with pores on the outer surface of the particles, that is, an area having a thickness in the range of 0.2-5 μm along the radial direction of the particles, with the outer surface of the cathode material particles as the 0 point of the thickness. The intermediate layer is an area with a thickness in the range of 0.5-20 μm. The area other than the surface layer and the intermediate layer in the cathode material particles is the central area. Taking the cross section of the cathode material particles as an example, the central part is the central area, the peripheral area having pores filled with elemental sulfur is the intermediate layer, and the outermost thin layer including elemental sulfur and elemental carbon is the surface layer.

According to an embodiment of the present application, the cathode material particle precursor may be formed by packing lithium oxide nanoparticles. In a later stage, elemental sulfur is filled in the precursor surface layer of the cathode material particle precursor, elemental carbon is formed on the outside of the elemental sulfur, and the elemental sulfur is further dispersed by thermal melting and interpenetration treatment, to finally obtain the cathode material particles with an intermediate layer with elemental sulfur distributed therein, and a surface layer with elemental sulfur and elemental carbon distributed therein. The main structure in the central area is still composed of lithium oxide, so the overall mechanical strength of the particles can be ensured, and no mass particle collapse and break up occur during the subsequent compaction process in the preparation of the battery. The depth of sulfur penetration can be achieved by controlling the thickness of the intermediate layer. When the lithium oxide nanoparticles with a size within the above range are packed to form a cathode material particle precursor, pores with a smaller size can be formed in the precursor surface layer in the cathode material particle precursor. In addition, due to the large aspect ratio of lithium oxide nanoparticles, the pores formed by packing has a small diameter and has a certain depth, which prevents the electrolyte from entering the pores to dissolve the filled sulfur.

According to some embodiments of this application, the lithium oxide nanoparticles are selected from one or more of rod-shaped lithium oxide and bulk lithium oxide. The lithium oxide nanoparticles are packed to form the cathode material particle precursor having pores in the precursor surface layer. The length of the lithium oxide nanoparticles may be 0.5-2 μm, the width may be 200-500 nm, and the aspect ratio may be 2-40. After packing lithium oxide nanoparticles having the above-mentioned size, the precursor surface layer of the cathode particle precursor is obtained and has pores suitable for filling elemental sulfur, and the pores have a pore size of 50-1000 nm, such as 500 nm. Elemental sulfur is filled in the pores to prevent elemental sulfur from being dissolved by the electrolyte. The elemental sulfur filled in the precursor surface layer can completely fill the pores of the precursor surface layer, or partially fill the pores of the precursor surface layer. That is, besides the area filled by elemental sulfur, some pore structures may be retained in the precursor surface layer. The pore size in the precursor surface layer of the cathode material particle precursor is similar to the pore size in the cathode material particle precursor (before filling the elemental sulfur).

The inventors find that by adjusting the morphology of the lithium oxide nanoparticles and the cathode material particle precursor formed by packing them, for example, the size of the lithium oxide nanoparticles, the gaps among the lithium oxide nanoparticles, the particle size of the cathode material particle precursor, and others, the sulfur atoms can fill the pores of the precursor surface layer better, so as to obtain a considerable filling ratio and filling stability, thereby increasing the specific capacity of the cathode material. In addition, by adjusting the size of the pores in the precursor surface layer, the dissolution of sulfur atoms in the cathode material by the electrolyte can be effectively reduced, so that a good cycle stability is obtained, and the battery using the cathode material can achieve a long excellent calendar life. The calendar life can be the time required for the battery to reach the end of life in an open circuit state at a certain reference temperature, that is, the life of the battery in a standby state. The particles with the above morphology can also increase the overall energy density of the cathode material without reducing the overall compaction density of the material, which is beneficial to increasing the volume energy density of the cathode material. When the cathode material is used in a lithium ion battery, a considerable battery performance can be obtained. It should be particularly noted that in this application, the term "lithium oxide nanoparticles", or "primary particles", specifically means that the size in any dimension such as length, diameter, and width is at the nanometer level.

The inventors find that comparing with the flake-shaped or granular lithium oxide nanoparticles, after the rod-shaped or bulk lithium oxide nanoparticles with the above-mentioned size are packed to form the cathode material particle precursor, the precursor surface layer of the cathode material particle precursor may have relatively regular pores suitable for accommodating elemental sulfur. The shape of the cathode material particle precursor formed by packing lithium oxide nanoparticles is not particularly limited, for example, one of spherical, rhombic, and ellipsoidal shapes.

According to an embodiment of the present application, the content of sulfur in the cathode material is not particularly limited, and can be selected by those skilled in the art according to actual situations. For example, according to some embodiments of the present application, the content of elemental sulfur can be 2-50 wt %, the content of lithium oxide can be 40-97.9 wt %, and the content of elemental carbon can be 0.1-10 wt %, based on the total weight of the cathode material particles.

According to an embodiment of the present application, the content of sulfur can be determined according to the pores in the precursor surface layer of the cathode material particle precursor. The inventors find that if the load of elemental sulfur is too high, the excess sulfur failed to be filled in the pores will nucleate individually, resulting in an increase in the impedance of the material, a tendency to dissolve in the electrolyte, and severe electrochemical degradation. According to a specific embodiment of the present application, when the content of elemental sulfur is within the above range, elemental sulfur can be prevented from individual nucleation. For example, the content of elemental sulfur may be 10-30 wt %. Elemental sulfur can be melted and then penetrates into the pores. Unlike ordinary physical mixing, in case that the elemental sulfur is melted and penetrates into the pores, the presence of sulfur can also be detected inside the lithium oxide particles. Elemental sulfur can be located in a region where the thickness of the precursor surface layer of the cathode particle precursor ranges from 0.5 to 20 μm.

According to an embodiment of the present application, the elemental carbon may have a layered or bulk structure. The surface layer of the cathode material particles may also have pores made of lithium oxide, and the elemental carbon and elemental sulfur may be distributed in the pores of the surface layer. The layered or bulk elemental carbon may have a thickness of 0.01-1 μm, and the size of the layered or bulk elemental carbon (the length or width of the layered or bulk upper surface) may be 0.5-5 μm. For example, specifically, the elemental carbon can be of a layered multilayer graphite structure or is formed of multilayer amorphous carbon. The thickness of the layered carbon can be 0.01-0.1 μm, and the length of the graphite layer or the amorphous carbon layer can be 0.5-1 μm. The elemental carbon can be located in an area closer to the outer surface of the entire cathode particle precursor. The present inventors find that when the elemental carbon is located in the surface layer of the particle precursor, the conductivity of the cathode material particles can be improved without affecting the overall compaction density of the final cathode material, and additional protection for elemental sulfur is provided, thereby further preventing the elemental sulfur from being dissolved in the electrolyte in practical applications. For example, according to a specific embodiment of the present application, the elemental carbon may be located in an area with a thickness of less than 5 μm in the cathode material particles, or in an area with a thickness of 0.1 to 0.5 μm. As a result, a more complex multilayer structure is formed among the particles formed by elemental carbon and lithium oxide. Elemental sulfur can fill in the gaps of the multilayer structure by thermal melting and interpenetration treatment. That is, the elemental sulfur after the thermal melting and interpenetration treatment can be located in the pores (formed by packed lithium oxide nanoparticles) in the intermediate layer of the cathode material particles, or among the layered elemental carbon in the surface layer of the cathode material particles, or in the gaps among the layered elemental carbon of the surface layer and the lithium oxide nanoparticles. Therefore, a more complicated multilayer core-shell structure of cathode material particles can be formed.

According to an embodiment of the present application, the specific thickness, material, morphology, and synthesis method of elemental carbon are not particularly limited, and familiar materials and methods can be selected by those skilled in the art according to actual situations to form elemental carbon. Accordingly, the electrolyte can be further blocked from entering the pores, to reduce the dissolution of elemental sulfur in the electrolyte. For example, according to a specific embodiment of the present application, elemental carbon can be formed by a method including, but not limited to, hydrothermal method and spray drying. Based on the total weight of the cathode material particles, the content of elemental carbon may be 0.1-10 wt %, for example, 3 wt %, 5 wt %, or 8 wt %.

In another aspect of this application, this application provides a method for preparing a cathode material comprising cathode material particles. The cathode material can have all the features and advantages of the above-described cathode material. Specifically, referring to FIG. 1, the method includes:

S100: Form a cathode material particle precursor, where the cathode material particle precursor has a precursor central area and a precursor surface layer.

According to an embodiment of the present application, in this step, a cathode material particle precursor is formed. As described above, the cathode material particle precursor can be formed by packing lithium oxide nanoparticles. The lithium oxide nanoparticles are rod-shaped or bulk lithium oxide nanoparticles, and the precursor surface layer of the formed cathode material particle precursor has pores suitable for filling elemental sulfur. The micro structure of the cathode material particle precursor is suitable for filling sulfur element, and the pores in the precursor surface layer are small, which can prevent sulfur from dissolving in the electrolyte. The finally obtained cathode material particle structure will not reduce the overall compaction density of the material, which facilitates the increase of the volume energy density.

Figure 2:
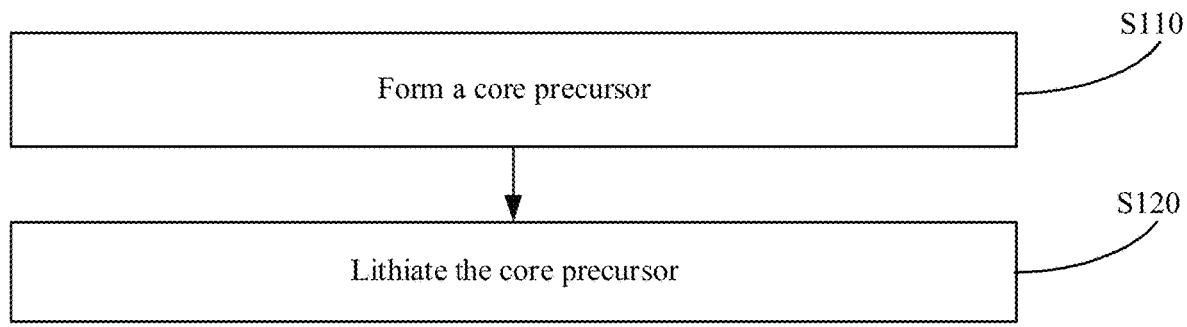
FIG. 2 is a process flow chart of a preparation method according to an embodiment of the present application.

According to a specific embodiment of the present application, referring to FIG. 2, the cathode material particle precursor can be obtained through the following steps:

S110: Form a core precursor.

According to an embodiment of the present application, in this step, a metal-ion-containing solution, a complexing agent, and a precipitating agent are mixed with stirring to obtain a precursor solution. After co-precipitation, a core precursor is obtained. The precipitating agent, complexing agent and metal-ion-containing solution are gradually added to the reactor.

As mentioned above, the cathode material particle precursor formed by the packing of lithium oxide nanoparticles with a certain shape (such as a rod shape) and size has pores that are more suitable for filling sulfur. Therefore, in this step, the morphology of the core precursor can be controlled by adjusting the stirring speed, the reaction temperature, the reaction pH, and the concentration of the complexing agent. Specifically, the gradually added precipitating agent and other solutions can provide a shear force during the formation of the core precursor, and the lithium oxide nanoparticles gradually grow and are packed to form the core precursor. By comprehensively controlling the stirring speed, the reaction temperature, the reaction pH, and the concentration of the complexing agent, the size of and pores in the core precursor formed can be controlled, to control the size of pores in the precursor surface layer of final cathode material particles. Specifically, the above conditions are controlled so that the lithium oxide nanoparticles obtained by lithiation have a length of 0.5-2 μm, a width of 200-500 nm, and an aspect ratio of the nano-scale particles of 2-40. The lithium oxide nanoparticles with a size in the above range can be packed to form a cathode material particle precursor with a precursor surface layer that has pores suitable for filling elemental sulfur. According to some embodiments of the present application, by controlling the above conditions, the size of pores in the precursor surface layer of the cathode material particle precursor is 50-1000 nm, such as 500 nm. As a result, not only nano-scale particles with a specific morphology (for example, a rod shape) can be obtained, and the packed cathode material particle precursor can also have a relatively uniform pore distribution and a relatively ideal morphology.

According to an embodiment of the present application, the metal can be provided by a solution containing metal ions, and more specifically, can be provided by an inorganic salt solution containing a metal element. The metal element includes at least one of Mn, Al, Nb, Fe, Co, and Ni, and the metal salt solution is added to the reactor with stirring. The above process can be carried out with heating, for example, at 30-60° C., such as 40° C., 45° C., 50° C., or 55° C. Specifically, the reactor can be placed in a water bath at 40-60° C. The metal salt solution may include a solution for forming an NCM or NCA material (without Li), and may be at least one of a nickel-containing salt solution, a cobalt-containing salt solution, and a manganese-containing salt solution, for example, a nitrate solution containing the above-mentioned metal ions. The complexing agent may be an alkaline solution, for example, aqueous ammonia. The concentration of aqueous ammonia can be 5-15 wt %. The specific chemical composition of the metal salt solution can be determined according to the content of metal elements in the lithium oxide to be formed. The chemical composition of the lithium oxide in the cathode material particle precursor has been described in detail above, and will not be repeated here again.

It should be particularly noted that in the step of forming the core precursor, the core precursor is also formed by packing nanoparticles, and the nanoparticles are subsequently lithiated to form lithium oxide nanoparticles that form the cathode material particle precursor. The lithiation process does not have a significant impact on the size of the nanoparticles. Therefore, in the step of forming the core precursor, the morphology and packing of the nanoparticles can be controlled to control the size of lithium oxide nanoparticles in the cathode material particle precursor obtained later and the size of the pores in the precursor surface layer.

According to an embodiment of the present application, the solution containing metal ions and the complexing agent are added to the reactor at a fixed ratio with stirring. The fixed ratio and the metal-ion-containing solution are determined according to the chemical composition of lithium oxide. The total amount of the metal-ion-containing solution in the mixed solution and the chemical composition of the metal can both be determined according to the chemical composition of the lithium oxide to be synthesized. The present inventors find that the stirring speed has a vital impact on the size of the lithium oxide nanoparticles formed later and the morphology of the core precursor, which further affects the morphology of the final cathode material particles. When the stirring speed is 300-1000 rpm/min, lithium oxide nanoparticles as described above can be obtained. Specifically, the stirring speed can be 600-800 rpm/min.

According to an embodiment of the present application, the precipitating agent may be a reagent that can precipitate metal ions, for example, an aqueous solution of a hydroxide, such as potassium hydroxide, sodium hydroxide, and the like. The precipitating agent can be pumped into the reactor containing the mixed solution by a variable speed transmitter. The pumping speed of the precipitating agent can be determined based on the pH value of the reaction system (i.e., the precursor solution). The pH value is controlled at a fixed value during the reaction, or fixed at a fixed value in the initial, middle, and late stages of the reaction. During the reaction process, with the co-precipitation with hydroxide, the hydroxide ions in the system are consumed, and the pH value of the system decreases. Therefore, a precipitating agent needs to be added to ensure the pH value of the precursor solution. When the pH value rises to a set value, the addition of precipitating agent is stopped. Generally, the pH value is kept unchanged during the entire reaction, that is, the pumping speed of the precipitating agent does not change, and the ratio of the added precipitating agent to the metal salt solution is about 2:1. Alternatively, according to other embodiments of the present application, it is also possible to control the pH at a low value in the early stage of the reaction, and then to increase the pH value subsequently.

Similarly, the precipitating agent can also be added at a temperature of 30-60° C., for example, 40° C. The amount of the precipitating agent added is not particularly limited, and can be determined by those skilled in the art according to the specific chemical composition of the lithium oxide, the total amount of the mixed solution, and the ratio of the complexing agent and the metal salt solution in the mixed solution. According to a specific embodiment of the present application, the pH of the obtained precursor solution can be controlled to 10-12, for example 11, by the amount of the precipitating agent added The precursor solution obtained after the above operation is allowed to stand at 45-60° C. for 15-30 hours (hrs) to cause a co-precipitation reaction. Thus, the core precursor is easily obtained.

S120: Lithiate the core precursor

According to an embodiment of the present application, in this step, the previously obtained core precursor and a lithium source are mixed and baked to lithiate the core precursor, thereby obtaining a cathode material particle precursor including a precursor central area, and a precursor surface layer located outside the precursor central area.

According to an embodiment of the present application, in this step, the specific type of the lithium source is not particularly limited, and an appropriate lithium-containing reagent can be selected by those skilled in the art according to actual needs. For example, according to a specific embodiment of the present application, an inorganic salt of lithium, such as nitrate, may be selected. The mixing ratio of the core precursor and the lithium source is not particularly limited, and can be determined according to the chemical composition of the lithium oxide. The baking treatment may be performed at a baking temperature of 600-800° C.

According to some embodiments of the present application, the lithiation of the core precursor may be mixing the previously obtained core precursor with a lithium salt (i.e., the lithium source) in water. After standing for a period of time, the precipitate is separated and dried by separation methods such as filtration, drying, and evaporation. The dried precipitate is baked at the above-mentioned baking temperature for a baking time that can be 10-18 hrs, such as 12 hrs.

In order to further improve the quality of the obtained cathode material particle precursor, a better crystal form (such as ternary crystal form) of lithium oxide is formed, while maintaining the pores in the previously formed core precursor. An annealing step is included after the baking. In addition, the baking process may include rapidly raising the temperature to the baking temperature, maintaining at the temperature for a short time, and then annealing. The process specifically includes:

raising the temperature quickly to the roasting temperature in a relatively short period of time, such as 15 min to 1 hour (hr), maintaining at the temperature for 0.5-2 hrs, and then quickly cooling to the room temperature. During the rapid cooling, the sample can be directly placed in an environment at the room temperature (where the temperature can be 0-40° C.). The cooling time for rapid cooling can be 20 min to 1 hr, the annealing temperature can be 450 to 700° C., such as 500° C., and the annealing time can be 3-8 hrs, such as 5 hrs.

S200: Mix the cathode material particle precursor with a sulfur source, melt and solidify.

According to an embodiment of the present application, in this step, the elemental sulfur and the cathode material particle precursor are mixed, melted and solidified, so that the elemental sulfur is filled in the pores in the precursor surface layer to form a sulfur-containing cathode material particle precursor. It should be particularly noted that in this step, elemental sulfur can also be located on the outer surface of the precursor surface layer. According to a specific embodiment of the present application, this step can be implemented by mixing the previously formed cathode material particle precursor, also known as the cathode active material, with a sulfur source, followed by a melting and solidification process. Elemental sulfur can penetrate into the pores after melting. Unlike ordinary physical mixing, in case that the elemental sulfur is melted and penetrates into the pores, the presence of sulfur can also be detected inside the cathode material particle precursor. This cannot be achieved by simple physical mixing. In addition, simple physical mixing results in poor adhesion of sulfur to the ternary material, and the electrical contact tends to be lost subsequently, leading to an electrochemical failure. Sulfur is also easier to dissolve in the electrolyte, causing a serious shuttle effect.

It should be particularly noted that although after the subsequent formation of elemental carbon, the elemental sulfur will be further dispersed by thermal melting and interpenetration treatment, the elemental sulfur formed in this step by the melting and solidification treatment has the above advantages on the one hand, and is more closely attached to the cathode material particle precursor on the other hand, to prevent the peeling off of elemental sulfur during the formation of elemental carbon, which will affect the performance of the finally obtained cathode material.

According to an embodiment of the present application, the cathode material particle precursor and the sulfur source can be mixed at a weight ratio of (8-12):(0.5-2). For example, the mixing ratio can be 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1 and the like. The sulfur source may be elemental sulfur. The temperature for the melting and solidification treatment can be 120-180° C., such as 130, 140, 150, 160, or 170° C., and the treatment time can be 10-15 hrs, such as 11, 12, 13, or 14 hrs. Specifically, the treatment can take place at 150° C. for 12 hrs. Therefore, sulfur can be conveniently filled into the pores in and on the outer surface of the precursor surface layer of the cathode material particle precursor formed previously.

According to an embodiment of the present application, the melting and solidification treatment may occur under an inert atmosphere. Alternatively, the treatment can take place in a sealed and pressurized container under an inert atmosphere, where the pressure of the container can be 5-12 MPa. For example, according to a specific embodiment of the present application, the lithium oxide particles and the sulfur source are mixed and placed in a sealed container, and then an inert gas is filled into the container for pressurization. According to a specific embodiment of the present application, the pressure after pressurization may be 10 MPa, 8 MPa, and others.

S300: Mix the sulfur-containing cathode material particle precursor with a carbon source, and form elemental carbon on the outer surface of the sulfur-containing cathode material particle precursor.

According to an embodiment of the present application, the carbon material for forming the elemental carbon is not particularly limited, and may be, for example, graphite, Ketjen black, graphene, carbon nanotubes, activated carbon, etc. The method of forming elemental carbon on the outer surface of the sulfur-containing cathode material particle precursor is not particularly limited, and can be, for example, spray drying, and hydrothermal method. By controlling the parameters for forming elemental carbon, the elemental carbon can be located on the outer surface of the sulfur-containing cathode material particle precursor, such as in a region with a thickness of less than 5 μm, for example, in a region with a thickness of 0.1 to 0.5 μm. For example, according to a specific embodiment of the present application, the elemental carbon can be formed by spray drying. Based on the total weight of the cathode material, in this step, the content of elemental carbon formed may be 0.1 to 10 wt %.

S400: Disperse elemental sulfur by thermal melting and interpenetration treatment.

As mentioned above, the sulfur-containing cathode material particle precursor and the carbon source are mixed, and elemental carbon is formed on the outer surface of the sulfur-containing cathode material particle precursor. Then the previously loaded elemental sulfur is further dispersed by the thermal melting and interpenetration treatment, so that elemental sulfur is dispersed in the pores among the lithium oxide nanoparticles, the pores among the elemental carbon, and the pores among the elemental carbon and the lithium oxide nanoparticles. Therefore, a more complicated multilayer core-shell structure of cathode lithium oxide can be formed. As a result, the elemental sulfur can be further separated from the electrolyte, thereby facilitating the improvement of the cycle performance and stability of the battery using the cathode material. The temperature for the thermal melting and interpenetration treatment can be 100 to 200° C., and the treatment time is 2 to 10 hrs. For example, the treatment can be implemented by heat treatment at 100 to 160° C. for 3-6 hrs.

In another aspect of this application, this application provides a cathode material. According to an embodiment of the present application, the cathode material is as described above, or is prepared by the method as described above. Therefore, the cathode material has all the features and advantages of the cathode material obtained by the aforementioned method, and will not be repeated here again.

In another aspect of this application, this application provides a lithium ion battery. The lithium ion battery includes the cathode material as described above. Therefore, the lithium ion battery has all the features and advantages of the cathode material as described above, and will not be repeated here again. In general, the lithium ion battery has a higher energy density and a better cycle life.

In another aspect of this application, this application provides a vehicle. According to an embodiment of the present application, the vehicle includes a lithium ion battery as described above. For example, the vehicle may include a plurality of battery packs composed of the aforementioned lithium ion batteries. Therefore, the vehicle has all the features and advantages of the lithium ion battery as described above, and will not be repeated here again.

The solutions of the present application are described below with reference to embodiments. A person skilled in the art may understand that the following embodiments are only used for describing the present application and should not be construed as a limitation to the scope of the present application. Specific technologies or conditions that are not noted in the embodiments are performed according to the technologies or conditions described in the documents in this field or according to a product specification.

Example 1: Production of Cathode Material (1) 50 mmol of nickel nitrate and 50 mmol of cobalt nitrate were dissolved in 100 g of water, pumped into a hydrothermal reactor with stirring, and stirred at 600 rpm/min. 5 g of aqueous ammonia (having a concentration of 10% by weight) was added at a constant rate, where the aqueous ammonia was pumped in at the same rate as that of the salt solution. Sodium hydroxide was added to adjust the pH to 11. Co-precipitation was carried out at 30° C. for 24 hrs, and a core precursor was obtained by filtration.

(2) The core precursor was mixed with lithium nitrate in water. The precipitate was separated by filtration, dried, baked at 700° C. for 1 hr, removed, allowed to cool to room temperature within 30 min, and then annealed at 500° C. for 5 hrs. A ternary cathode material particle precursor was obtained.

(3) The ternary cathode material particle precursor was mixed with elemental sulfur at a weight ratio of 10:1, thermally treated in a muffle furnace, reacted at 150° C. for 12 hrs, removed, dried, and pulverized to obtain a sulfur-containing cathode material particle precursor.

(4) The sulfur-containing cathode material particle precursor and graphene were spray dried at a weight ratio of 100:5, and then added to a hydrothermal reactor and thermally treated at 150° C. for 4 hrs to obtain cathode material particles.

Example 2: Production of Cathode Material

The steps were the same as those in Example 1, except that the ternary cathode material particle precursor and elemental sulfur were mixed at a weight ratio of 10:0.5, and then reacted in a hydrothermal reactor at a temperature of 150° C. for 12 hrs.

Example 3: Production of Cathode Material

The steps were the same as those in Example 2, except that in Step (3), the ternary cathode material particle precursor and elemental sulfur were mixed at a weight ratio of 8:1. Step (4) was as follows.
(4) The sulfur-containing cathode material particle precursor and graphene were spray dried at a weight ratio of 100:8, and then added to a hydrothermal reactor and thermally treated at 150° C. for 4 hrs to obtain a cathode material.

Example 4: Production of Cathode Material

The steps were the same as those in Example 2, except that Steps (3) and (4) were as follows.
(3) The ternary cathode material particle precursor and elemental sulfur were mixed at a weight ratio of 14:1, fed to a hydrothermal reactor, pressurized by introducing an inert gas, sealed, and reacted for 12 hrs at 150° C. under a pressure of 10 MPa. The obtained material was dried and pulverized to obtain a sulfur-containing cathode material particle precursor.
(4) The sulfur-containing cathode material particle precursor and graphene were spray dried at a weight ratio of 100:8, and then added to a hydrothermal reactor and thermally treated at 150° C. for 4 hrs to obtain a cathode material.

Comparative Example 1

(1) 50 mmol of nickel nitrate and 50 mmol of cobalt nitrate were dissolved in 100 g of water, and then 5 g of aqueous ammonia (having a concentration of 10% by weight) was added. Sodium hydroxide was added to adjust the pH to 11. Co-precipitation was carried out at 30° C. for 24 hrs, and a core precursor was obtained by filtration.
(2) The core precursor and lithium nitrate were mixed in water, removed, dried, and baked at 700° C. for 5 hrs to obtain a ternary cathode material particle precursor.
(3) The ternary cathode material particle precursor, elemental sulfur, and acetylene black were directly mixed at a weight ratio of 100:10:5.

Comparative Example 2

(1) 50 mmol of nickel nitrate and 50 mmol of cobalt nitrate were dissolved in 100 g of water, and then 5 g of aqueous ammonia (having a concentration of 10% by weight) was added. Sodium hydroxide was added to adjust the pH to 11. Co-precipitation was carried out at 30° C. for 24 hrs, and a core precursor was obtained by filtration.
(2) The core precursor was mixed with lithium nitrate in water, removed, dried, and then baked at 700° C. for 1 hr. The obtained material was removed while it was at 700° C., rapidly cooled to room temperature, and then annealed at 500° C. for 5 hrs. A ternary cathode material particle precursor was obtained.
(3) The ternary cathode material particle precursor, elemental sulfur, and acetylene black were directly mixed at a weight ratio of 100:10:5.

Performance Test

1. Characterization of Morphology

The morphologies of the samples obtained in the above examples and the intermediates during the preparation process were observed under a scanning electron microscope (SEM).

Figure 3:
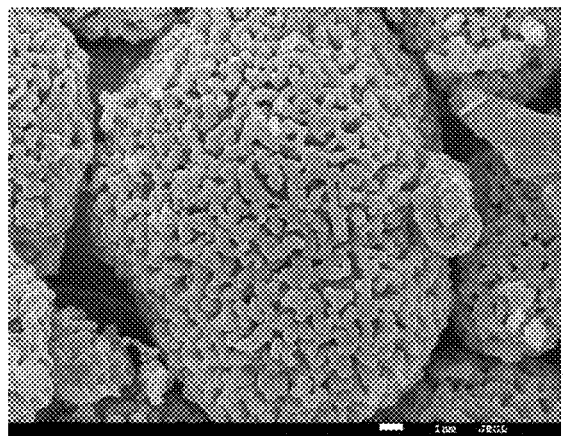
FIG. 3 shows a scanning electron microscopy (SEM) image of a cathode material particle precursor prepared in an embodiment of the present application.

Referring to FIG. 3, the lithiated cathode material particles obtained in Examples 1 to 4 are spherical particles of about 5-10 μm, and the diameter of the pores in the intermediate layer of the particles is about 500 nm-1 μm.

Figure 4:
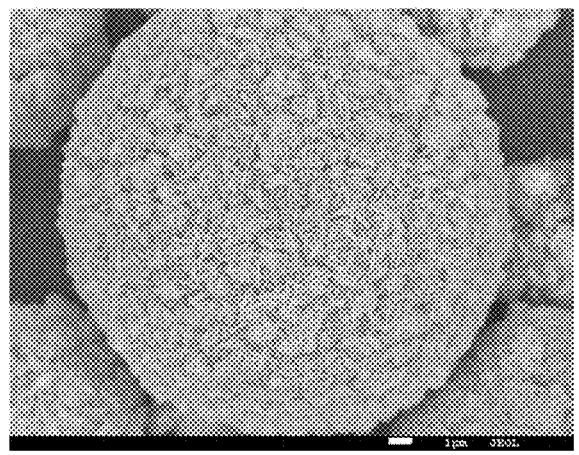
FIG. 4 shows an SEM image of a sulfur-containing cathode material particle precursor formed with elemental carbon prepared in an embodiment of the present application.
Figure 5:
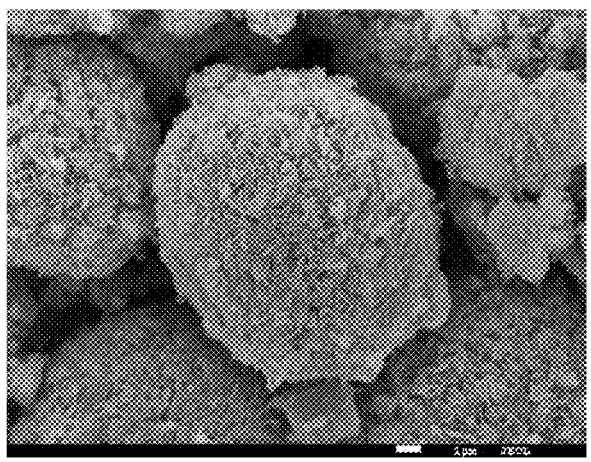
FIG. 5 shows an SEM image of cathode material particles prepared in an embodiment of the present application.

The active materials formed with elemental carbon obtained in Examples 1 to 4 are shown in FIG. 4. Elemental carbon is formed in the pores in the surface layer of the particles, and is partially distributed on the surface of the lithium oxide particles. The morphology after the thermal melting and interpenetration treatment is shown in FIG. 5. The test results are shown in Table 1.

2. Sulfur Content Test

Sulfur content in samples obtained from the above examples and comparative examples were tested. Specific test methods and steps: the overall sulfur content in the material was tested by a carbon-sulfur analyzer. The test results are shown in Table 1.

TABLE 1

| | | | | | | |
|---|---|---|---|---|---|---|
| | Test results of samples | | | | | |
| Sample | Example 1 | Example 2 | Example 3 | Example 4 | Comparative Example 1 | Comparative Example 2 |
| Sulfur content | 2.5% | 4.7% | 10% | 5.8% | 9.1% | 9.1% |
| Particle size | 5-10 μm | 6-20 μm | 15-25 μm | 8-17 μm | 10-20 μm | 5-15 μm |
| Total thickness of surface layer and intermediate layer | 0.5-3 μm | 1-5 μm | 2-10 μm | 1-5 μm | Without intermediate layer and surface layer | Without intermediate layer and surface layer |

It can be seen from the test results that the materials obtainable in the examples and comparative examples all have considerable sulfur content. In addition, because the elemental sulfur and ternary cathode material are directly mixed without the heat treatment in the two comparative examples, a higher sulfur content test result is shown when the sulfur content is tested directly.

3. Volume Energy Density Test

Specific test method: 5 g of the cathode materials obtained in the above examples and comparative examples were taken respectively, mixed with a cathode conductive agent and a cathode binder, fed to a mold with a diameter of 2 cm, and pressed under a pressure of 10 Mpa to obtain a powder. The volume energy density of the cathode active material was calculated as follows.

The highest height that the powder can be pressed under the above pressure is h, and the compaction density of the powder is $\rho=5/\pi r^2 h$.

The energy density is calculated by a formula below:

energy density=specific capacity*average charging voltage*compaction density of the powder.

The test results are shown in Table 2:

TABLE 2

| Test results of energy density of samples | | | | | | |
|---|---|---|---|---|---|---|
| Sample (cathode material) | Example 1 | Example 2 | Example 3 | Example 4 | Comparative Example 1 | Comparative Example 2 |
| Energy density/(wh/L) | 2524 | 2863 | 3165 | 3024 | 1921 | 2027 |

It can be seen from the test results that although the samples obtained in Comparative Example 1 and Comparative Example 2 have higher sulfur content in the sulfur content test, their energy density is significantly lower than that of the samples obtained in the Examples. This is because the samples are a cathode material during the sulfur content test. Therefore, in the samples from the comparative examples formed by direct mixing, some of the sulfur element is adsorbed on the surface of the ternary material by physical adsorption. However, after the cathode material undergoes the above processes of preparing the battery (such as coating, drying, and soot blowing, etc.), a part of the physically adsorbed elemental sulfur will be lost, but the heat-treated samples from Example 1-Example 4 will not suffer from the loss as that does in the comparative examples. In addition, after the cathode sample is in contact with the electrolyte, the cathode materials prepared in Comparative Example 1 and Comparative Example 2 fail to have the morphology of the particles in Example 1 to Example 4, so the dissolution of elemental sulfur loaded therein after contacting with the electrolyte cannot be alleviated. In Comparative Example 1, the core precursor is synthesized without stirring, so the morphology of the core precursor cannot be well controlled, and only a simple one-step heat treatment is performed during the lithiation of the core precursor, so the morphology of the core precursor cannot be well retained. Therefore, the finally obtained cathode material particles do not have the intermediate layer and the surface layer. In Comparative Example 2, although rapidly cooling and annealing are performed in the lithiation process to maintain a certain morphology (with pore structures in an outer area having a thickness ranging from 1 to 5 microns), elemental sulfur is only attached to the surface, so the dissolution of elemental sulfur cannot be prevented. Moreover, the sulfur source is not heat-treated, but directly mixed. Therefore, the adhesion between sulfur and the ternary material is poor, and electrical contact tends to be lost subsequently, resulting in electrochemical failure and unsatisfactory energy density. In addition, the morphology of the particles of Example 1 to Example 4 can also maintain the compaction density of the material as a whole after the compaction process, which is more conducive to obtaining a considerable energy density.

In the description of the present specification, the description of the reference terms "an embodiment", "another embodiment" and the like means that specific features, structures, materials or characteristics described in combination with the embodiment are included in at least one embodiment of the present application. In the present specification, the illustrative expression of the above terms is not necessarily referring to the same embodiment or example. Moreover, the described specific features, structures, materials or characteristics may be combined in any suitable manners in one or more embodiments. In addition, in a case that is not mutually contradictory, a person skilled in the art can combine or group different embodiments or examples that are described in the present specification and features of the different embodiments or examples.

The implementations of the present application are described in detail above. However, the present application is not limited to the specific details in the foregoing implementations, various simple variants may be performed on the technical solutions of the present application within a technical concept scope of the present application, and the simple variants all fall within the protection scope of the present application.

It should be further noted that the specific technical features described in the above specific embodiments may be combined in any suitable manner without contradiction. In addition, the various implementations of the present application may be combined without departing from the idea of the present application, and such combinations shall also fall within the scope of the present application.

What is claimed is:

1. A cathode material, comprising cathode material particles, wherein each of the cathode material particles comprises a central portion, an intermediate layer, and a surface layer, wherein the intermediate layer is located between the central portion and the surface layer and comprises lithium oxide, the central portion comprises lithium oxide, the intermediate layer comprises a pore structure filled with elemental sulfur and formed by packing the lithium oxide, and the surface layer comprises elemental sulfur and elemental carbon, wherein the lithium oxide comprises $\delta\text{LiNi}_m\text{Co}_n\text{X}_{(1-m-n)}\text{O}_2 \cdot (1-\delta)\text{Li}_2\text{MO}_3$, and $0 \leq \delta \leq 1$, X is at least one selected from Mn, Al, Nb, and Fe, M is at least one selected from Mn, Al, Nb, Fe, Co, and Ni, $0 \leq m < 1$, and $0 \leq n < 1$.

2. The cathode material according to claim 1, wherein the cathode material particles have an average particle size of 5-50 μm, the intermediate layer has a thickness of 0.5-20 μm, and the surface layer has a thickness of 0.2-5 μm.

3. The cathode material according to claim 1, wherein the cathode material particles comprise at least one of a spherical, rhombic, or ellipsoidal shape.

4. The cathode material according to claim 1, wherein based on a total weight of the cathode material particles, content of the elemental sulfur is 2-50 wt %, content of the lithium oxide is 40-97.9 wt %, and content of the elemental carbon is 0.1-10 wt %.

5. A lithium ion battery, comprising a cathode material, wherein the cathode material comprises cathode material particles, wherein each of the cathode material particles comprises a central portion, an intermediate layer, and a surface layer, wherein the intermediate layer is located between the central portion and the surface layer and comprises lithium oxide, the central portion comprises lithium oxide, the intermediate layer comprises a pore structure filled with elemental sulfur and formed by packing the lithium oxide, and the surface layer comprises elemental sulfur and elemental carbon, wherein the lithium oxide comprises $\delta\text{LiNi}_m\text{Co}_n\text{X}_{(1-m-n)}\text{O}_2 \cdot (1-\delta)\text{Li}_2\text{MO}_3$, and $0 \leq \delta \leq 1$, X is at least one selected from Mn, Al, Nb, and Fe, M is at least one selected from Mn, Al, Nb, Fe, Co, and Ni, $0 \leq m < 1$, and $0 \leq n < 1$.

6. The lithium ion battery according to claim 5, wherein the cathode material particles have an average particle size of 5-50 μm, the intermediate layer has a thickness of 0.5-20 μm, and the surface layer has a thickness of 0.2-5 μm.

7. The lithium ion battery according to claim 5, wherein the cathode material particles comprise at least one of a spherical, rhombic, or ellipsoidal shape.

8. The lithium ion battery according to claim 5, wherein based on a total weight of the cathode material particles, content of the elemental sulfur is 2-50 wt %, content of the lithium oxide is 40-97.9 wt %, and content of the elemental carbon is 0.1-10 wt %.

9. A method for preparing the cathode material according to claim 1, wherein the method comprises:

mixing a solution containing metal ions, a complexing agent, and a precipitating agent while stirring, co-precipitating to obtain a core precursor, and mixing the core precursor with a lithium source and baking to obtain cathode material particle precursors formed by packing the lithium oxide, wherein each of the cathode material particle precursors comprises a precursor central portion and a precursor surface layer located outside the precursor central portion, wherein a metal for the solution comprises at least one of Mn, Al, Nb, Fe, Co, and Ni;

mixing the cathode material particle precursors with a sulfur source, which is subject to melting and solidifying to fill the elemental sulfur in the precursor surface layer and obtain sulfur-containing cathode material particle precursors;

mixing the sulfur-containing cathode material particle precursors with a carbon source, and forming the elemental carbon on an outer surface of each of the sulfur-containing cathode material particle precursors; and dispersing the elemental sulfur by thermal melting and interpenetration treatment, to obtain the cathode material particles.

10. The method according to claim 9, wherein each of the cathode material particle precursors is formed by packing lithium oxide nanoparticles, and a length of each of the lithium oxide nanoparticles is 0.5-2 μm, a width of each of the lithium oxide nanoparticles is 200-500 nm, and an aspect ratio of each of the lithium oxide nanoparticles to 2-40.

11. The method according to claim 10, wherein the precursor surface layer has pores, the elemental sulfur fills in the pores, and a pore size is 50-1000 nm.

12. The method according to claim 9, wherein the core precursor is obtained at 30-60° C., pH of a solution in the co-precipitating is 10-12, and a speed of the stirring is 300-1000 rpm/min.

13. The method according to claim 9, wherein the metal ions comprise at least one of Mn ions, Al ions, Nb ions, Fe ions, Co ions, or Ni ions; and the complexing agent comprises aqueous ammonia, and the precipitating agent comprises potassium hydroxide and sodium hydroxide.

14. The method according to claim 9, wherein the cathode material particle precursors and the sulfur source are mixed at a weight ratio of (8-12):(0.5-2), a temperature for the melting and solidifying is performed at 120-180° C. for 10-15 hrs.

15. The method according to claim 9, wherein a temperature for the thermal melting and interpenetration treatment is performed at 100 to 200° C. for 2 to 10 hrs.

16. The method according to claim 9, wherein the sulfur-containing cathode material particle precursors and the carbon source are mixed at a weight ratio of 100:(10-0.1) and spray dried; and the thermal melting and interpenetration treatment is performed at 100-200° C. for 1-10 hrs.

* * * * *